United States Patent
Code et al.

(10) Patent No.: US 7,559,062 B2
(45) Date of Patent: Jul. 7, 2009

(54) INTELLIGENT SCHEDULER FOR MULTI-LEVEL EXHAUSTIVE SCHEDULING

(75) Inventors: Sean Donald Robert Code, Kanata (CA); Aaron Maxwell MacDonald, Ottawa (CA)

(73) Assignee: Alcatel Lucent, Paris (FR)

( * ) Notice: Subject to any disclaimer, the term of this patent is extended or adjusted under 35 U.S.C. 154(b) by 920 days.

(21) Appl. No.: 10/695,953

(22) Filed: Oct. 30, 2003

(65) Prior Publication Data

US 2005/0097556 A1     May 5, 2005

(51) Int. Cl.
     *G06F 9/46*      (2006.01)
     *G06F 3/00*      (2006.01)

(52) U.S. Cl. .................. 718/102; 718/103; 718/104; 719/312

(58) Field of Classification Search ......... 718/100–108; 705/8, 9; 719/311–316
See application file for complete search history.

(56) References Cited

U.S. PATENT DOCUMENTS

| | | | | |
|---|---|---|---|---|
| 4,980,824 | A * | 12/1990 | Tulpule et al. | 718/106 |
| 6,625,750 | B1 * | 9/2003 | Duso et al. | 714/11 |
| 6,789,067 | B1 * | 9/2004 | Liebenow | 705/15 |
| 6,948,172 | B1 * | 9/2005 | D'Souza | 718/106 |
| 7,203,943 | B2 * | 4/2007 | Shaffer | 718/104 |
| 2002/0156669 | A1 * | 10/2002 | Verhaegh et al. | 705/8 |
| 2003/0037091 | A1 * | 2/2003 | Nishimura et al. | 709/103 |
| 2003/0101084 | A1 | 5/2003 | Perez | |
| 2003/0120709 | A1 * | 6/2003 | Pulsipher et al. | 709/106 |
| 2003/0191795 | A1 * | 10/2003 | Bernardin et al. | 709/105 |

OTHER PUBLICATIONS

Derwent Information Ltd "Thread priority control apparatus in computer system—has priority modication unit which raises priority level of thread to predetermined limit" Nov. 30, 1999.*

* cited by examiner

*Primary Examiner*—Meng-Ai An
*Assistant Examiner*—Charles E Anya

(57) ABSTRACT

A method and apparatus are provided for scheduling tasks within a computing device such as a communication switch. When a task is to be scheduled, other tasks in the work queue are analyzed to see if any can be executed simultaneously with the task to be scheduled. If so, the two tasks are combined to form a combined task, and the combined task is placed within the job queue. In addition, if the computing device has insufficient resources to execute the task to be scheduled, the task is placed back into the work queue for future scheduling. This is done in a way which avoids immediate reselection of the task for scheduling. Task processing efficiency is increased, since combining tasks reduces the waiting time for lower priority tasks, and tasks for which there are insufficient resources are delayed only a short while before a new scheduling attempt, rather than rejecting the task altogether.

6 Claims, 2 Drawing Sheets

INTELLIGENT SCHEDULER FOR MULTI-LEVEL EXHAUSTIVE SCHEDULING

FIELD OF THE INVENTION

The invention relates to computing and communication systems, and more particularly to task scheduling within such systems.

BACKGROUND OF THE INVENTION

Servers, switches, routers, and other computing devices which process many tasks require a scheduler to set the order in which tasks will be executed. As tasks arise, a task manager places the tasks within a work queue. The scheduler retrieves tasks from the work queue one at a time, and places them into a job queue. The computing device executes tasks within the job queue using resources. Since resources are limited, only a limited number of tasks can be in the job queue at any given time. If each task has an associated priority, then the scheduler should place the tasks into the job queue such that higher priority tasks are executed before lower priority tasks.

One form of scheduling which allows priorities to be set is multi-level exhaustive scheduling. Each task has one of a set of ordered priorities, and is binned within the work queue according to its priority. More than one task can have the same priority, and there may be more than one task within the work queue at each of the set of priorities. This is the "multi-level" aspect of the scheduling. The scheduler first selects a task within the work queue for which no other task has a higher priority, and places it in the job queue. The scheduler then repeats this for other tasks. In this way, all the tasks having the highest priority are scheduled before any task of the second highest priority are scheduled, and so on for tasks of each priority within the set of priorities. This is the "exhaustive" aspect of the scheduling. If a new task having the highest priority arrives in the work queue while the scheduler is scheduling tasks having the second highest priority, the scheduler stops scheduling tasks having the second highest priority and schedules instead the new task.

Schedulers typically place tasks within the job queue based on their priority within the work queue. Tasks are therefore selected one at a time from the job queue for execution, higher priority tasks being executed before lower priority tasks. This is true even for tasks which could otherwise be executed simultaneously. Each task within the job queue requires resources for execution, so one package is sent to one line card for transmission, and then an identical package (other than destination) is sent to a second line card for transmission. The scheduler treats each of the two tasks separately, scheduling each one within the job queue independently. This delays execution of tasks of lower priority, since computing resources must fully process the two separate tasks independently before processing of lower priority tasks can occur.

One way in which schedulers improve efficiency of the job queue is to not schedule tasks for which there are insufficient resources to execute the task. When the scheduler selects a task from the work queue, the scheduler determines whether there are sufficient resources (as examples, available line cards, bandwidth, or slot numbers) to execute the task. If there are insufficient resources to execute the task, the scheduler rejects the task. If the resource insufficiency is only temporary, then the task may be rejected unnecessarily. A scheduler that took advantage of multi-tasking and that did not reject high priority tasks unnecessarily would improve efficiency of task execution.

SUMMARY OF THE INVENTION

In accordance with one aspect of the invention, a method is provided for scheduling a first task within a computing device. A work queue of waiting tasks awaiting scheduling is maintained. Location of at least one selected task from within the work queue which is capable of being executed simultaneously with the first task is attempted. If at least one selected task is located, the at least one selected task is combined with the first task to form a combined task, and the combined task is scheduled.

In accordance with another aspect of the invention, a method is provided for scheduling a first task within a computing device. A work queue of a plurality of waiting tasks awaiting scheduling is maintained. It is determined whether the computing device has sufficient resources to execute the first task. If the computing device has sufficient resources to execute the first task, location of at least one selected task from within the work queue which is capable of being executed simultaneously with the first task is attempted, and if at least one such selected task is located, the at least one selected task is combined with the first task to form a combined task and the combined task is scheduled.

If the computing device does not have sufficient resources to execute the first task, then it may be determined whether the first task is time sensitive. If the first task is time sensitive, the first task is rejected. If the first task is not time sensitive, the scheduling of a second task is attempted before attempting to schedule the first task.

Processors and software-readable media are provided as apparatus for executing the above methods.

The method and scheduler of the present invention allow tasks to be executed more efficiently. By analyzing other tasks within the work queue, opportunities for multitasking can be found. Tasks which would otherwise be scheduled individually can be merged into a single task within the job queue, thereby reducing the resources necessary for execution of the tasks and reducing the waiting time of subsequent tasks within the work queue having a lower priority. Tasks for which there are insufficient resources to execute at the time of scheduling are placed back in or left in the work queue, rather than being rejected, and delayed slightly so that scheduling of the task is not re-attempted immediately.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
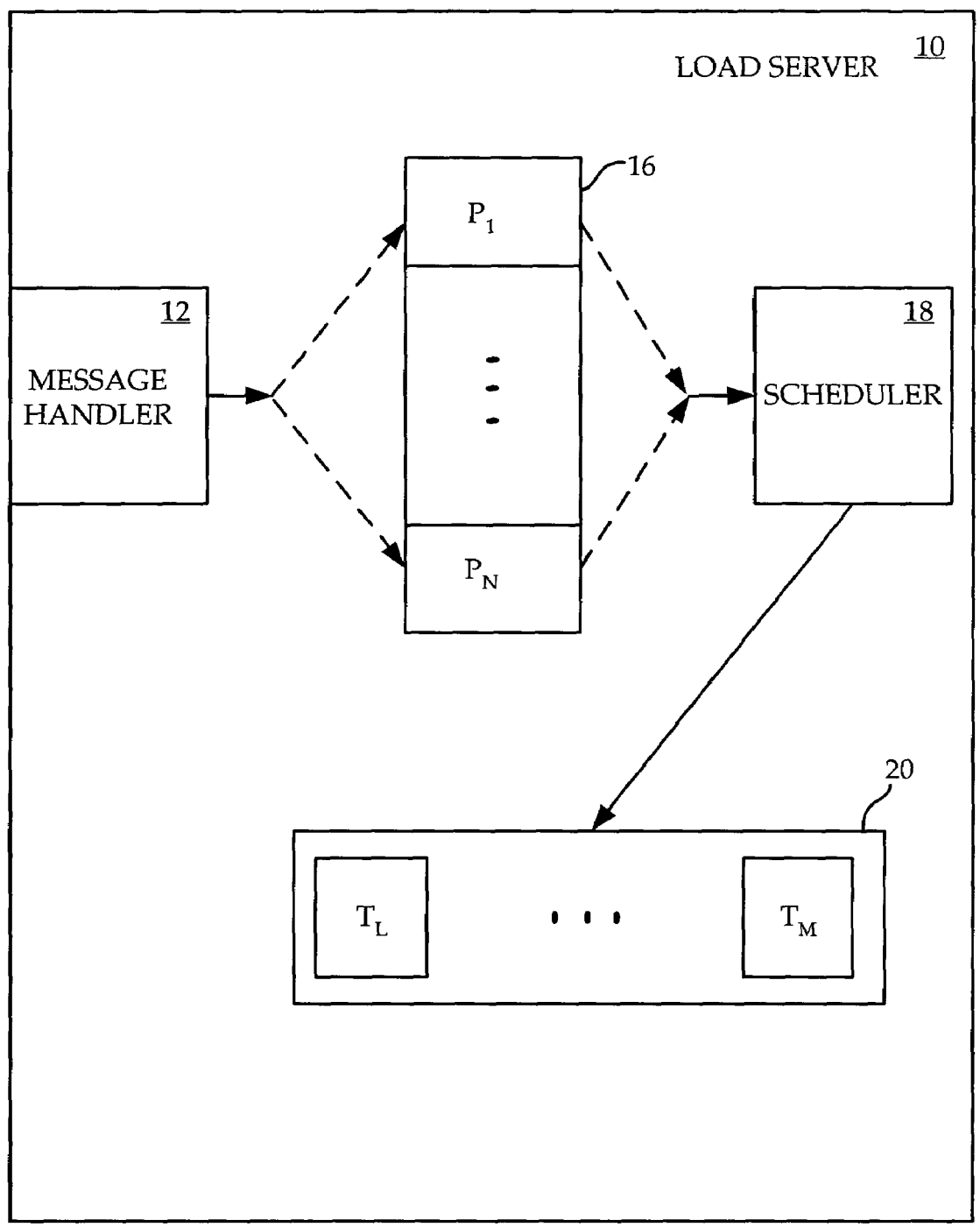
FIG. 1 is a block diagram of a portion of a load server.

Referring to FIG. 1, a block diagram of a portion of a load server 10 is shown. The load server 10 includes a message handler 12 which receives tasks from a management layer (not shown in FIG. 1). Each task has one of a plurality of ordered priorities $P_1$ to $P_N$, $P_1$ being the highest priority. Each task includes a number of fields of ancillary information, including a list of at least one destination. As the message handler receives each task, the message handler determines the priority of the task and places the task in a work queue 16. Tasks stored within the work queue 16 are referred to herein as waiting tasks, and are ordered by priority. For example, the work queue could include a linked list for each of the priorities, each linked list containing tasks of the corresponding priority. Although some waiting tasks may have the same priority, there will always be a waiting task for which no other waiting task has a higher priority. A scheduler 18 accesses tasks within the work queue 16 and places the tasks into a job queue 20, as described below with reference to FIG. 2. The job queue usually includes a plurality of scheduled tasks $T_L \ldots T_M$, although more generally there may be only one scheduled task within the job queue or the job queue may be empty on occasion.

The scheduler 18 includes instructions for scheduling tasks within the work queue 16. In the preferred embodiment, the instructions are in the form of software running on a processor, and may be stored on a computer-readable medium. More generally, the instructions may be in the form of any combination of software or hardware within a processor, including hardware within an integrated circuit. The processor need not be a single device, but rather the instructions could be located in more than one device.

Broadly, the scheduler 18 retrieves a task having a highest priority from the work queue 16. The scheduler determines whether there are sufficient resources available to execute the task. If there are sufficient resources to execute the task, the scheduler attempts to combine the task with at least one other task within the work queue 16 in order to take advantage of multitasking. If there are insufficient resources to process the task the scheduler leaves the task in the work queue 16 if the task is not time sensitive, and selects a different task for scheduling, leaving scheduling of the first task for a future attempt.

Figure 2:
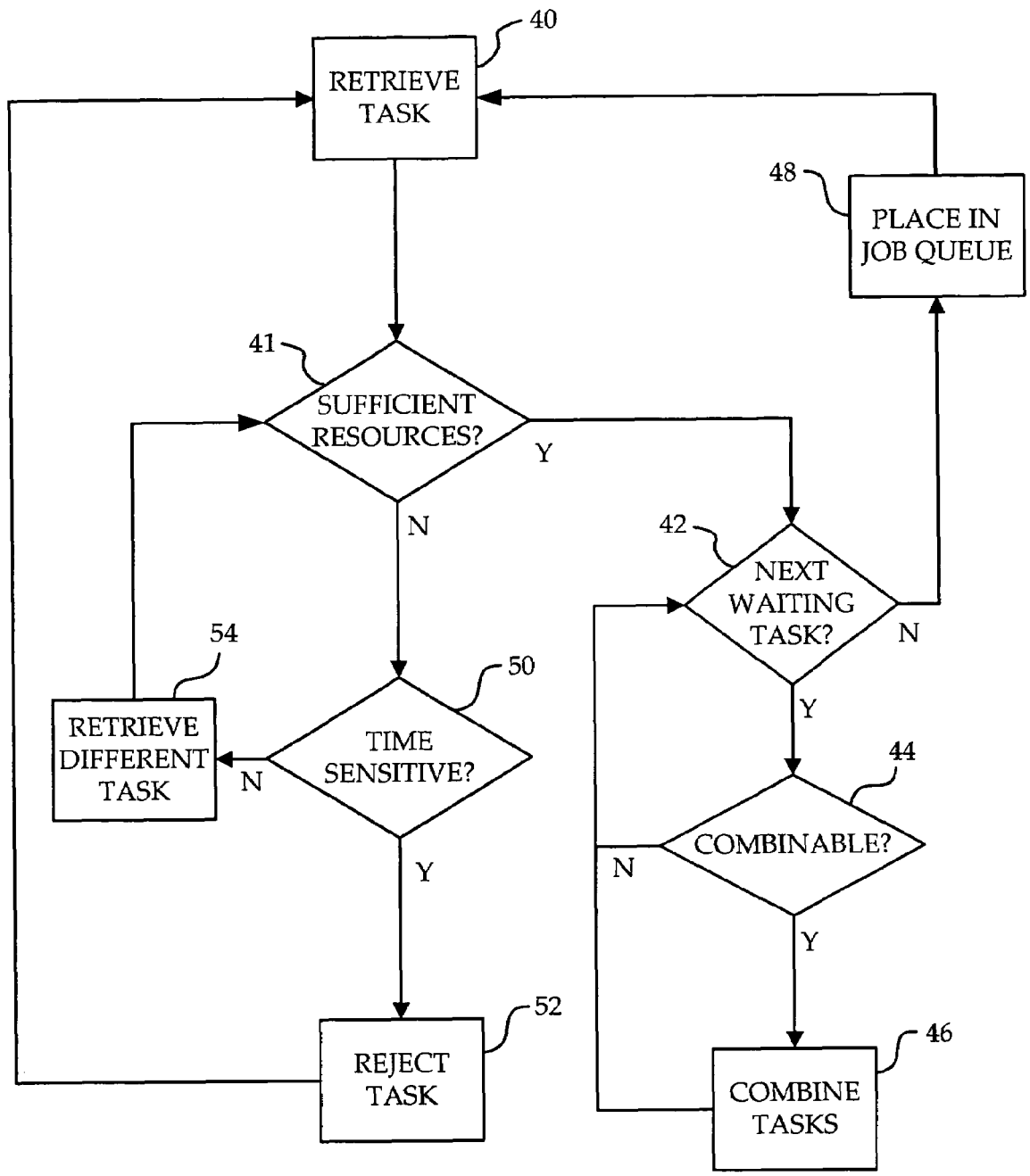
FIG. 2 is a flowchart of a method by which the scheduler of FIG. 1 schedules tasks according to one embodiment of the invention.

Referring to FIG. 2, a flowchart of a method by which the scheduler 18 performs task scheduling according to one embodiment of the invention is shown. At step 40 the scheduler retrieves a first task from the work queue 16. The first task is a task for which there is no waiting task in the work queue 16 having a higher priority. At step 41 the scheduler determines whether there are sufficient resources to execute the first task. If there are sufficient resources to execute the first task, then the scheduler attempts to combine the first task with other waiting tasks in the work queue. At step 42 the scheduler attempts to select a waiting task from within the work queue that has the same priority as the first task. If the waiting tasks are stored as linked lists, then the scheduler simply selects the waiting task following the first task in the linked list, if any. If a waiting task is found, the scheduler determines at step 44 whether the waiting task and the first task can be combined to take advantage of multitasking.

If the scheduler determines that the waiting task can not be combined with the first task, the scheduler attempts to select a next waiting task at step 42. The scheduler continues to select waiting tasks until either a waiting task is located which can be combined with the first task, or no more waiting tasks are found. If a waiting task is found which can be combined with the first task, then at step 46 the scheduler combines the waiting task with the first task to form a combined task. The waiting task that was combined with the first task is removed from the work queue.

The scheduler then continues retrieving waiting tasks having the same priority as the first task at step 42, for example by continuing down a linked list, for attempted combination with the first task at step 46. If more than one waiting task can be combined with the first task, then each such waiting task combined with the first task in turn, and the combined tasks thereby includes successively more tasks. When no more waiting tasks of the same priority as the first task are found at step 42, the scheduler places the combined task, or the first task if no combinable tasks were found, into the job queue at step 48. The scheduler then retrieves a second task from the work queue at step 40 for scheduling.

If the scheduler determines at step 41 that there are insufficient resources to execute the first task, then the scheduler determines at step 50 whether the first task is time sensitive. If the scheduler determines that the first task is time sensitive, then at step 52 the scheduler rejects the first task and selects a second waiting task for scheduling at step 40. If the scheduler determines that the first task is not time sensitive, then the scheduler leaves the first task in the work queue, and retrieves a second task from the work queue at step 54. Step 54 differs from step 40 in which waiting task is selected. In step 40 the scheduler simply selects a waiting task for which no other waiting task has a higher priority, such as by selecting the first waiting task in a linked list. In step 54 the scheduler selects a waiting task other than the first task, for which there were insufficient resources to execute. For example, the scheduler may select the next waiting task in the linked list following the first task. In this way, a first task for which there were insufficient resources for execution but which is left in the work queue is not immediately reselected for scheduling. Scheduling of at least one other task will be attempted before re-attempting to schedule a task for which there were insufficient resources.

The invention has been described as combining delayed scheduling of a non-time sensitive of a task for which there are insufficient resources (either by placing the task back in the work queue or by simplying skipping over the task) and the combination of tasks which can take advantage of multitasking. These aspects of the invention could be implemented independently. Task processing efficiency would still be improved if only one aspect were implemented, although not by as much as it would be improved if both aspects are implemented.

The embodiments presented are exemplary only and persons skilled in the art would appreciate that variations to the above described embodiments may be made without departing from the spirit of the invention. Methods which are logically equivalent or similar to the method shown in FIG. 2 may be used to implement the methods of the invention. For example, the steps 42 and 44 together allow the scheduler to attempt to find another task in the work queue with which the first task can be combined for multitasking purposes. Other means of locating such a task within the work queue are within the scope of the invention. The scope of the invention is solely defined by the appended claims.

We claim:

1. A processor for scheduling a first task within a computing device, comprising:
   a) instructions for accessing a work queue of a plurality of waiting tasks waiting scheduling;
   b) instructions for determining whether the computing device has sufficient resources to execute the first task and for determining whether the first task is time sensitive, in the event that the computing device does not have sufficient resources to execute the first task;
   c) instructions for attempting to locate at least one selected task from within the work queue which is capable of being executed simultaneously with the first task, in the event that the computing device has sufficient resources to execute the first task, and for rejecting the first task, in the event that the computing device does not have sufficient resources to execute the first task and that the first task is time sensitive;

d) instructions for combining the at least one selected task with the first task to form a combined task and scheduling the combined task, in the event that the computing device has sufficient resources to execute the first task and that at least one selected task is located; and e) instructions for attempting to schedule a second task before attempting to schedule the first task, in the event that the computing device does not have sufficient resources to execute the first task and that the first task is not time sensitive.

2. A computer-readable medium comprising instructions for scheduling a first task within a computing device, comprising:

a) instructions for accessing a work queue of a plurality of waiting tasks awaiting scheduling and for determining whether the first task is time sensitive, in the event that the computing device does not have sufficient resources to execute the first task;

b) instructions for determining whether the computing device has sufficient resources to execute the first task and for rejecting the first task, in the event that the computing device does not have sufficient resources to execute the first task and that the first task is time sensitive;

c) instructions for attempting to locate at least one selected task from within the work queue which is capable of being executed simultaneously with the first task, in the event that the computing device has sufficient resources to execute the first task and for attempting to schedule a second task before attempting to schedule the first task, in the event that the computing device does not have sufficient resources to execute the first task and that the first task is not time sensitive; and d) instructions for combining the at least one selected task with the first task to form a combined task and scheduling the combined task, in the event that the computing device has sufficient resources to execute the first task and that at least one selected task is located.

3. A method for scheduling a first task within a computing device, comprising the steps of:

a) accessing a work queue of a plurality of waiting tasks waiting scheduling;

b) determining whether the computing device has sufficient resources to execute the first task and for determining whether the first task is time sensitive, in the event that the computing device does not have sufficient resources to execute the first task;

c) attempting to locate at least one selected task from within the work queue which is capable of being executed simultaneously with the first task, in the event that the computing device has sufficient resources to execute the first task, and rejecting the first task, in the event that the computing device does not have sufficient resources to execute the first task and that the first task is time sensitive;

d) combining the at least one selected task with the first task to form a combined task and scheduling the combined task, in the event that the computing device has sufficient resources to execute the first task and that at least one selected task is located; and e) attempting to schedule a second task before attempting to schedule the first task, in the event that the computing device does not have sufficient resources to execute the first task and that the first task is not time sensitive.

4. A processor for scheduling a first task within a computing device, comprising:

a) instructions for accessing a work queue of a plurality of waiting tasks waiting scheduling;

b) instructions for determining whether the computing device has sufficient resources to execute the first task and for determining whether the first task is time sensitive, when the computing device does not have sufficient resources to execute the first task;

c) instructions for attempting to schedule a second task before attempting to schedule the first task, when the computing device does not have sufficient resources to execute the first task and the first task is not time sensitive; and d) instructions for rejecting the first task such that the first task is immediately eligible for retrieval when the computing device does not have sufficient resources to execute the first task and the first task is time sensitive.

5. A computer-readable medium comprising instructions for scheduling a first task within a computing device, comprising:

a) instructions for accessing a work queue of a plurality of waiting tasks awaiting scheduling and for determining whether the first task is time sensitive, in the event that the computing device does not have sufficient resources to execute the first task;

b) instructions for determining whether the computing device has sufficient resources to execute the first task and for rejecting the first task, in the event that the computing device does not have sufficient resources to execute the first task and that the first task is time sensitive;

c) instructions for attempting to locate at least one selected task from within the work queue which is capable of being executed simultaneously with the first task; and d) instructions for combining the at least one selected task with the first task to form a combined task and scheduling the combined task, in the event that the computing device has sufficient resources to execute the first task and that at least one selected task is located.

6. A method for scheduling a first task within a computing device, comprising the steps of:

a) accessing a work queue of a plurality of waiting tasks waiting scheduling;

b) determining whether the computing device has sufficient resources to execute the first task and for determining whether the first task is time sensitive, when the computing device does not have sufficient resources to execute the first task;

c) attempting to schedule a second task before attempting to schedule the first task, when the computing device does not have sufficient resources to execute the first task and the first task is not time sensitive; and d) rejecting the first task such that the first task is immediately eligible for retrieval when the computing device does not have sufficient resources to execute the first task and the first task is time sensitive.

* * * * *